(12) United States Patent
Koyama et al.

(10) Patent No.: US 7,186,109 B2
(45) Date of Patent: Mar. 6, 2007

(54) STAMPER HOLDER, MOLD COMPONENT, AND MOLD ASSEMBLY

(75) Inventors: Atsushi Koyama, Tokyo (JP); Mikio Domon, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/806,179

(22) Filed: Mar. 23, 2004

(65) Prior Publication Data
US 2004/0191352 A1  Sep. 30, 2004

(30) Foreign Application Priority Data
Mar. 26, 2003  (JP)  ............... 2003-084134

(51) Int. Cl.
B29D 11/00  (2006.01)
(52) U.S. Cl. ............... 425/192 R; 425/542; 425/810
(58) Field of Classification Search ............ 425/192 R, 425/542, 810; 264/106, 107
See application file for complete search history.

(56) References Cited

U.S. PATENT DOCUMENTS

| | | | | | |
|---|---|---|---|---|---|
| 4,302,175 | A | * | 11/1981 | McNeely | 425/385 |
| 4,472,124 | A | * | 9/1984 | Kashihara et al. | 425/3 |
| 2003/0194464 | A1* | | 10/2003 | Iida et al. | 425/542 |
| 2004/0228940 | A1* | | 11/2004 | Ebina | 425/406 |

FOREIGN PATENT DOCUMENTS

| | | |
|---|---|---|
| JP | 9-123229 | 5/1997 |
| JP | 09293279 | 11/1997 |
| JP | 10-302328 | * 11/1998 |

OTHER PUBLICATIONS

English abstract and computer translation for JP 10-302328.*
English Language Abstract of JP 9-123229.
English Language Abstract of JP09-293279.

* cited by examiner

*Primary Examiner*—Donald Heckenberg
(74) *Attorney, Agent, or Firm*—Greenblum & Bernstein, P.L.C.

(57) ABSTRACT

A stamper holder capable molding of a substrate having a high-quality. The stamper holder is mounted in a mold of a mold assembly that molds a substrate for an information recording medium, together with a stamper having a molding surface for forming micro asperities in a surface of the substrate, in a state where the stamper is fitted in an insertion hole formed through a central portion of the stamper. The stamper holder is formed such that an outer periphery thereof is increased in diameter on a side toward the molding surface compared with a reverse side thereof to form a sloped surface, and part or all of an outer peripheral surface of the stamper holder opposed to an inner peripheral surface of the stamper defining the insertion hole has a shape complementary to the inner peripheral surface of the stamper.

2 Claims, 4 Drawing Sheets

F I G. 1
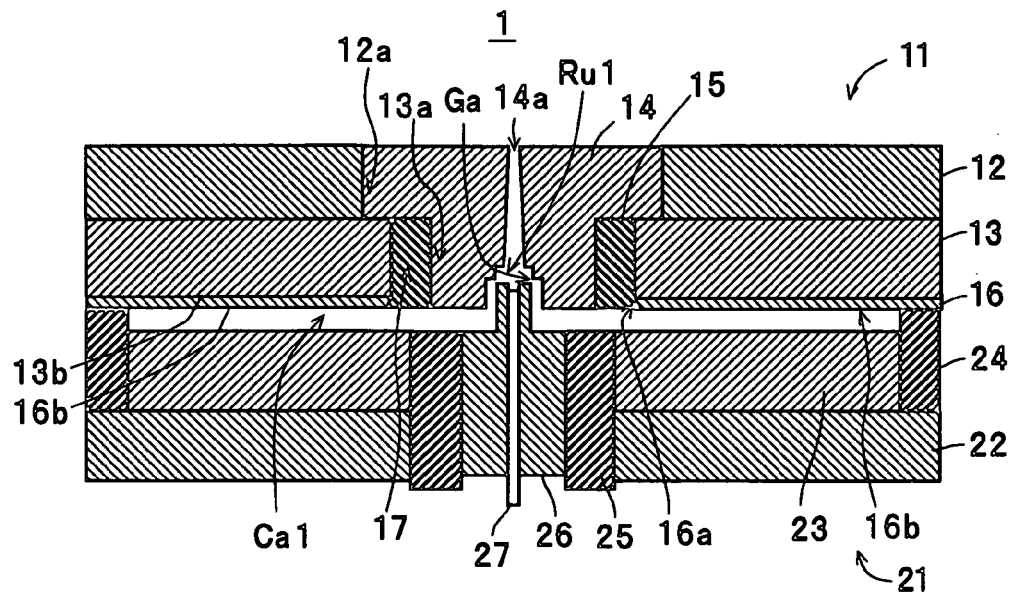
F I G. 2
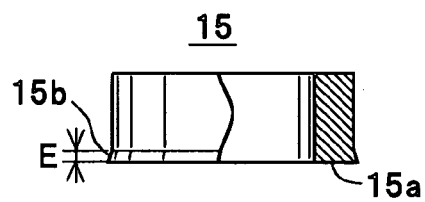
F I G. 3
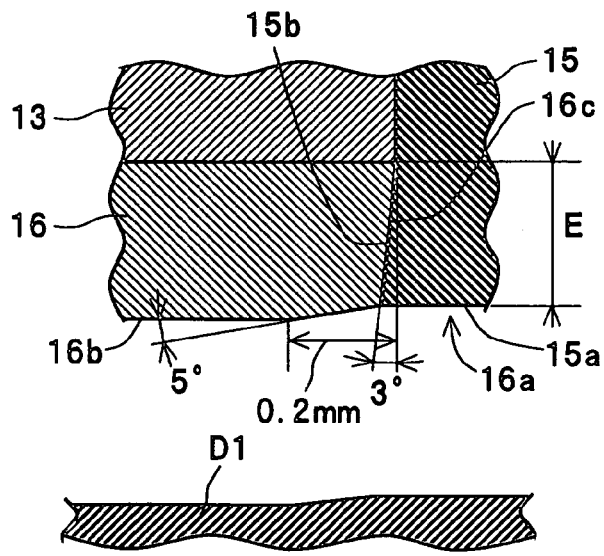

STAMPER HOLDER, MOLD COMPONENT, AND MOLD ASSEMBLY

BACKGROUND OF THE INVENTION

1. Field of the Invention

This invention relates to a stamper holder that is mounted in a mold of a mold assembly, together with a stamper, for forming a substrate for an information recording medium, a mold component that includes the stamper holder and the stamper and is mounted in the mold, and a mold assembly in which the mold component is mounted.

2. Description of the Related Art

Conventionally, as a mold assembly for molding a substrate for an optical recording medium, such as a CD (Compact Disc) and a DVD (Digital Versatile Disc), Japanese Laid-Open Patent Publication (Kokai) No. H09-123229 discloses a mold assembly that includes a fixed mold having a stamper set therein for forming micro asperities, such as grooves, in a surface of the substrate, and a movable mold which cooperates with the fixed mold to define a cavity as a substrate-molding space.

The mold assembly is comprised of the fixed mold, the movable mold, and a peripheral mold. The fixed mold has a cavity-defining section partitioned on one side thereof, for forming one major surface of a disk-shaped substrate (base) on one side thereof. The movable mold is disposed in opposed-relation to the fixed mold and configured such that it is movable toward and away from the fixed mold by a guide means and a drive means. Further, the movable mold has a cavity-defining section partitioned on a side thereof opposed to the fixed mold, for forming the other major surface of the substrate on the other side. The fixed mold and the movable mold are mounted to mold-mounting parts of an injection molder. Further, the peripheral mold is associated with the movable mold, for molding a peripheral part of the substrate. The fixed mold, the movable mold, and the peripheral mold are clamped to cooperatively define the cavity as the substrate-molding space.

Further, the cavity-defining section of the fixed mold formed on the side thereof opposed to the movable mold, for defining the cavity, has as a smooth flat surface. The cavity-defining section has a stamper mounted thereon. In this case, the stamper has minute asperities formed in a major surface thereof facing the cavity, for forming an information signal-recording portion on the one major surface of the substrate. The stamper is in the form of a disk having a central hole formed through a central portion thereof, and mounted in the fixed mold using an inner periphery-side stamper holder and an outer periphery-side stamper holder. More specifically, the inner periphery-side stamper holder of the two stamper holders has a generally hollow cylindrical shape having an outer diameter approximately equal to the inner diameter of the central hole of the stamper, and at the same time has a wedge-shaped engaging portion integrally formed on its outer peripheral edge in a manner protruding therefrom. Therefore, the engaging portion of the inner periphery-side stamper holder is caused to be opposed to and engaged with the inner peripheral wall of the central hole of the stamper, whereby the stamper has its inner peripheral portion held by the inner periphery-side stamper holder, for being mounted in the fixed mold.

However, the present inventors studied the stamper holder and the mold assembly, and found out the following problems: As disclosed in Japanese Laid-Open Patent Publication (Kokai) No. H09-293279, when the central hole of the stamper is formed by a punching machine, the inner peripheral surface of the central hole is in the form of a tapered surface. Therefore, as shown in FIG. 9, in the case of the conventional mold assembly 100, when the stamper 119 is held by the inner periphery-side stamper holder 118, the inner peripheral surface A of the stamper 119 and the outer peripheral surface B of the inner periphery-side stamper holder 118 are in line contact with each other via respective portions thereof indicated by a symbol C. On the other hand, when the substrate (base) is molded, a high-temperature resin is injected into the cavity, so that the stamper 119 repeatedly undergoes thermal expansion and thermal contraction. In the state where the contact area between the stamper 119 and the inner periphery-side stamper holder 118 is small, the stamper 119 is displaced to be made off-center when the high-temperature resin is injected into the cavity, so that the deviation (eccentricity) of the center of the substrate from the center of the grooves formed in the major surface of the substrate increases. Further, the small contact area makes the inner peripheral surface of the stamper 119 easy to wear, so that as wear occurs, the displacement of the stamper 119 becomes marked. Therefore, this stamper holder 118 suffers from the problem that due to the displacement (eccentricity) of the stamper 119 during molding, the quality of the substrate as the molded product is degraded.

On the other hand, a mold assembly 61 is also known in which a stamper 64 is mounted in a fixed mold 63 using a stamper holder 62 having no engaging portion (designated by a symbol D in FIG. 9), as shown in FIG. 10. In this mold assembly 61, however, the resin material enters a gap between the inner peripheral surface A of the stamper 64 and the outer peripheral surface B of the stamper holder 62. Therefore, this mold assembly 61 suffers from the problem that burrs are formed on the surface of the substrate 65 to degrade the quality of the substrate 65.

SUMMARY OF THE INVENTION

The present invention has been made to solve the problems described above, and a main object thereof is to provide a stamper holder, a mold component, and a mold assembly, which are capable molding of a substrate having a high-quality.

To attain the above object, in a first aspect of the present invention, there is provided a stamper holder for being mounted in a mold of a mold assembly that molds a substrate for an information recording medium, together with a stamper having a molding surface for forming micro asperities in a surface of the substrate for the information recording medium, in a state where the stamper is fitted in an insertion hole formed through a central portion of the stamper, wherein the stamper holder is formed such that an outer periphery of the stamper holder is increased in diameter on a side toward the molding surface compared with a reverse side thereof to form a sloped surface, and part or all of an outer peripheral surface of the stamper holder opposed to an inner peripheral surface of the stamper defining the insertion hole has a shape complementary to the inner peripheral surface of the stamper.

With the arrangement of this stamper, all or part of the outer peripheral surface of the stamper holder opposed to the inner peripheral surface of the stamper defining the insertion hole is formed to have a shape complementary to the inner peripheral surface of the stamper, whereby the stamper is held by the stamper holder in a state of the entire inner peripheral surface of the stamper being in surface contact with the outer peripheral surface of the stamper holder. Therefore, compared with the conventional stamper holder which is in line contact with the stamper, the frictional force between the stamper holder and the stamper is increased, so that the force of the stamper holder holding the stamper can be increased while enabling reduction of the wear of the stamper. Therefore, it is possible to positively prevent the displacement (eccentricity) of the stamper during molding, whereby the stamper can be positioned with high accuracy. As a result, it is possible to form the substrate having a high quality. Further, since there is no gap formed between the inner peripheral surface of the stamper and the outer peripheral surface of the stamper holder, it is possible to prevent formation of burrs on the surface of the substrate.

To attain the above object, in a second aspect of the present invention, there is provided a mold component for being mounted in a mold of a mold assembly that molds a substrate for an information recording medium, comprising a stamper having a molding surface for forming micro asperities in a surface of the substrate for the information recording medium and having an insertion hole formed through a central surface thereof, and a stamper holder for being fitted in an insertion hole formed through a central portion of the stamper, thereby holding the stamper, the insertion hole being formed such that the insertion hole has a larger diameter on a side of the molding surface than a diameter thereof on a reverse side, and part or all of an outer peripheral surface of the stamper holder opposed to an inner peripheral surface of the stamper defining the insertion hole being formed to have a shape complementary to the inner peripheral surface of the stamper.

With the arrangement of this mold component, by using the stamper holder, it is possible to form the substrate having a high quality, similarly to the stamper holder.

Preferably, the stamper holder is formed such that an end face of the stamper holder on a cavity side is flush with the molding surface. With the arrangement of this preferred embodiment, it is possible to prevent undesired steps formed on the surface of the substrate.

To attain the above object, in a third aspect of the present invention, there is provided a mold assembly that molds a substrate for an information recording medium, comprising a mold, and a mold component for being mounted in the mold of the mold component comprising a stamper having a molding surface for forming micro asperities in a surface of the substrate for the information recording medium and having an insertion hole formed through a central portion thereof, and a stamper holder for being fitted in the insertion hole formed through the central portion of the stamper, thereby holding the stamper, the stamper holder being formed such that an outer periphery of the stamper holder is increased in diameter on a side toward the molding surface compared with a reverse side thereof to form a sloped surface, and part or all of an outer peripheral surface of the stamper holder opposed to an inner peripheral surface of the stamper defining the insertion hole has a shape complementary to the inner peripheral surface of the stamper.

With the arrangement of this mold assembly, by using the mold component, it is possible to form the substrate having a high quality, similarly to the stamper holder.

It should be noted that the disclosure of the present specification relates to the subjects included in Japanese Patent Application No. 2003-084134 which was filed with Japanese Patent Office on Mar. 26, 2003, and all of the disclosures thereby are expressly incorporated herein by reference.

BRIEF DESCRIPTION OF THE DRAWINGS

These and other objects and features of the present invention will be explained in more detail below with reference to the attached drawings, wherein:

FIG. 1 is a cross-sectional view showing the construction of a mold assembly according to an embodiment of the present invention;

FIG. 2 is a partly cut-away front view showing the construction of a stamper holder of the mold assembly shown in FIG. 1;

FIG. 3 is an enlarged cross-sectional view of an essential portion, designated by E in FIG. 2, of the stamper holder and portions of components associated therewith;

DESCRIPTION OF THE PREFERRED EMBODIMENTS

The stamper holder, the mold component, and the mold assembly in which the mold component is mounted, according to the invention, will now be described in detail with reference to the drawings showing preferred embodiments thereof.

First, the construction of a mold assembly 1 will be described with reference to drawings.

Figure 4:
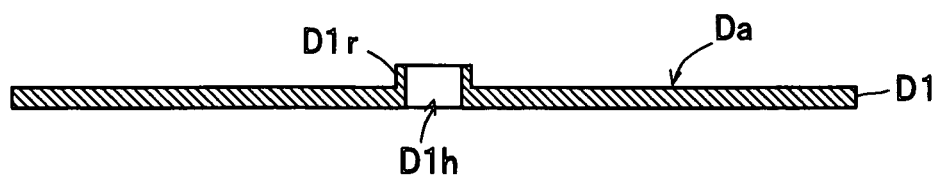
FIG. 4 is a front cross-sectional view of a substrate manufactured by the mold assembly shown in FIG. 1.

Referring first to FIG. 1, the mold assembly 1 is comprised of a fixed mold 11, and a movable mold 21 which can move toward and away from the fixed mold 11. Further, the mold assembly 1 is configured such that a substrate D1 for an optical recording medium (information recording medium in the present invention; hereinafter simply referred to as "the substrate D1") formed with a central hole D1$h$ and a hollow cylindrical protruding portion D1$r$, as shown in FIG. 4, can be molded by causing an injection molding apparatus, not shown, to inject a molten resin material into a cavity Ca1 defined by the molds 11 and 12 in a closed state thereof.

As shown in FIG. 1, the fixed mold 11 is comprised of a fixed-side mounting plate 12, a fixed-side mirror 13, a sprue bushing 14, a stamper holder 15, and a stamper 16. The fixed-side mounting plate 12 is configured such that it can be mounted on a fixed-side platen of the injection molding apparatus, not shown, and has a hole 12$a$ circular in cross-section formed through a central portion thereof. The fixed-side mirror 13, which is disk-shaped, is mounted on the fixed-side mounting plate 12, and configured such that a hole 13a circular in cross-section extends through a central portion thereof, for communication with the hole 12a. Further, the fixed-side mirror 13 is formed with holes, not shown, serving as air-sucking passages for sucking air to attract the stamper 16 to a mirror surface (facing toward the cavity Ca1) 13b and each of the holes has one end communicating with piping, not shown, of a vacuum pump outside the mold assembly 1. The sprue bushing 14 is configured such that it has a hole 14a extending through a central portion thereof, and is fitted into the holes 12a and 13a.

Figure 9:
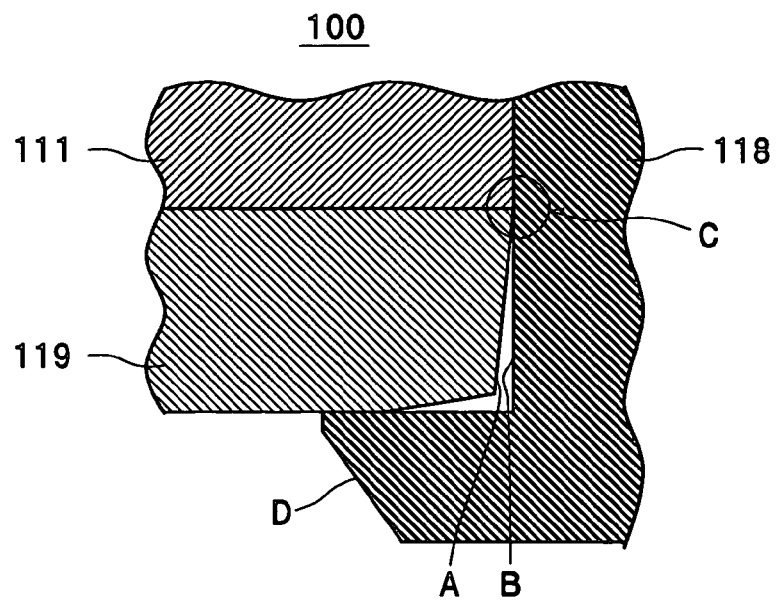
FIG. 9 is an enlarged cross-sectional view useful in explaining a state of contact between a stamper and an inner periphery-side stamper holder in a conventional mold assembly.
Figure 10:
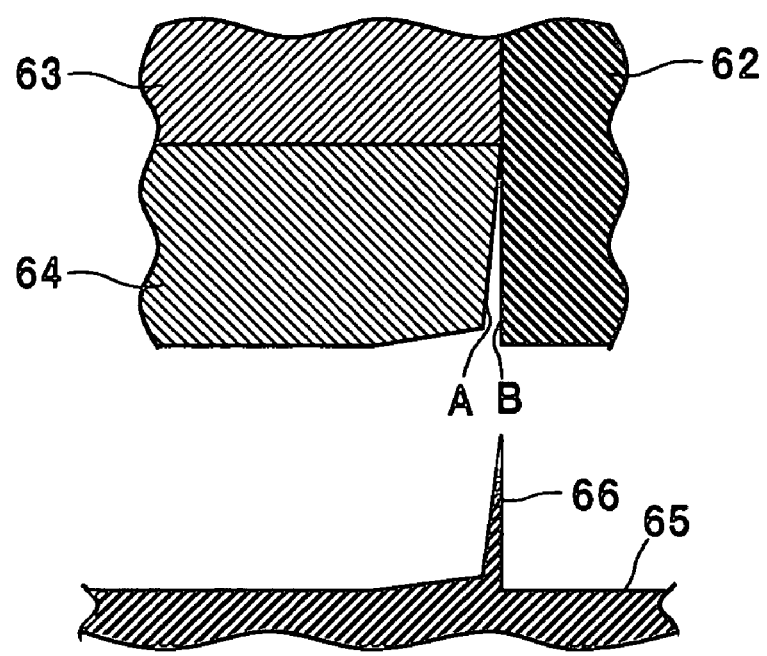
FIG. 10 is an enlarged cross-sectional view showing a state of contact between a stamper and a stamper holder of a conventional mold assembly, and a corresponding portion of a substrate formed thereby.

The stamper holder 15 constitutes the mold component according to the present invention together with the stamper 16, and is formed to have, as shown in FIG. 2, a hollow cylindrical shape, such that it can be removably mounted in a gap 17 between the outer peripheral surface of the sprue bushing 14 and the inner peripheral surface of the fixed-side mirror 13, which defines the hole 13a, as shown in FIG. 1. Further, the stamper holder 15 is configured, as shown in FIG. 2, such that a portion E protruding from the mirror surface 13b and opposed to the inner peripheral surface 16c (see FIG. 3) of the stamper 16 has an outer diameter gradually increased toward the movable mold 21. More specifically, when the insertion hole 16a is punched out, the inner peripheral surface of the stamper 16 defining the insertion hole 16a is formed as a tapered surface (sloped surface) such that the diameter thereof on the side of a groove-forming surface (molding surface) 16b is larger than the diameter thereof on the reverse side. On the other hand, the stamper holder 15 is configured such that all the region of the portion E thereof opposed to the inner peripheral surface of the stamper 16 defining the insertion hole 16a is formed as a reverse-tapered surface complementary to the inner peripheral surface of the stamper 16. Therefore, by forming the outer peripheral surface 15b of the stamper holder 15, as the reverse-tapered surface, an unintended removal of the stamper 16 from the stamper holder 15 is prevented, similarly to the stamper holder provided with the aforementioned engaging portion (indicated by a symbol D in FIG. 9), without providing the engaging portion. It should be noted that it is not necessarily required to form all of the outer peripheral surface 15b of the portion E as the reverse-tapered surface complementary to the inner peripheral surface of the stamper 16, but it is possible to form part of the outer peripheral surface 15b of the portion E as a reverse-tapered surface complementary to an associated portion of the inner peripheral surface of the stamper 16 to such an extent that displacement (eccentricity) of the stamper 16 and an unintended removal of the same can be avoided. In this case, the part of the outer peripheral surface 15b may be a part in the circumferential direction of the outer peripheral surface 15b, or a part in the axial direction (vertical direction as viewed in FIG. 3).

In this case, the present inventors have found out that as shown in FIG. 3, a taper angle of the inner peripheral surface 16c of the stamper 16 is within a range of 2 degrees to 5 degrees (3 degrees in the illustrated example). Therefore, the outer peripheral surface of the 15b of the portion E of the stamper holder 15 is also shaped as the reverse-tapered surface which widens at an angle of about 3 degrees (one example within the range of 2 degrees to 5 degrees). Further, the present inventors have found out that as shown in FIG. 3, a portion of the stamper 16 in the vicinity of the rim of the insertion hole 16a within a range of 0.1 mm to 0.5 mm (0.2 mm in the illustrated example) from the insertion hole 16a is formed as a sloped surface gradually recessed at an angle of 2 degrees to 10 degrees (5 degrees in the illustrated example) to the groove-forming surface 16b of the stamper 16 toward the insertion hole 16a. On the other hand, when the substrate D1 is formed, to avoid formation of undesired steps on the surface thereof, it is preferable that the end face 15a of the stamper holder 15 facing toward the cavity Ca1 and the rim of the insertion hole 16a in the groove-forming surface 16b of the stamper 16 are flush with each other. Therefore, in the illustrated example, the end face 15a of the stamper holder 15 is formed to be recessed to a depth of about 0.02 mm (0.2×tan5°=0.0175 mm) from the groove-forming surface 16b of the stamper 16. As a consequence, the end face 15a of the stamper holder 15 and the rim of the insertion hole 16a in the groove-forming surface 16a of the stamper are flush with each other.

The stamper 16 is formed to be generally disk-shaped, and at the same time, the groove-forming surface 16b facing toward the cavity Ca1 is formed with minute asperities, not shown, such that minute asperities, such as grooves, can be formed in a surface of the substrate D1 when the substrate D1 is molded. Further, as shown in FIG. 1, the stamper 16 has an insertion hole 16a formed through a central portion thereof. Further, the stamper 16 is mounted to the mirror surface 13b of the fixed-side mirror 13 in a state held by the stamper holder 15 fitted in the insertion hole 16a. In this case, since the shape of the outer peripheral surface 15b of the portion E of the stamper holder 15 is formed complementary to the inner peripheral surface 16c of the stamper 16, as described above, the entire inner peripheral surface 16c of the stamper 16 maintains surface contact with the outer peripheral surface 15b of the stamper holder 15, as shown in FIG. 3.

On the other hand, as shown in FIG. 1, the movable mold 21 is comprised of a movable-side mounting plate 22, a movable-side mirror 23, an outer peripheral ring 24, an ejector sleeve 25, a gate cutting sleeve 26, and an ejector pin 27.

Next, a method of molding the substrate D1 using the above mold assembly 1 will be described.

First, the fixed-side mounting plate 12 is secured to the fixed-side platen of the injection molding apparatus, not shown, whereby the fixed mold 11 is mounted on the injection molding apparatus. Next, the movable-side mounting plate 22 is attached to a movable-side platen of the injection molding apparatus, whereby the movable mold 21 is mounted on the injection molding apparatus. Then, the driving means of the injection molding apparatus is operated to close the fixed mold 11 and the movable mold 21. At this time, as shown in FIG. 1, the disk-shaped cavity Ca1 capable of molding the substrate D1 is formed by the molds 11 and 21. Further, a runner Ru1 is formed between the upper surface of the gate cutting sleeve 26 and one end face of the ejector pin 27, and an inner peripheral surface of the sprue bushing 14, which defines the hole 14a. Then, a molten resin material is injected from a nozzle of the injection molding apparatus. The molten resin material injected is filled in the cavity Ca1 through the runner Ru1 and a gate Ga. Then, the gate cutting sleeve 26 and the ejector pin 27 are forwardly (upwardly) moved toward the sprue bushing 14 when the resin material in the cavity Ca1 is still soft, whereby the resin material in the runner Ru1 and the resin material in the cavity Ca1 are separated at a location of the gate Ga.

Next, after the resin material in the cavity Ca1 is sufficiently cooled to be solidified, the driving means of the injection molding apparatus is operated to move the movable mold 21 away from the fixed mold 11 to open the mold assembly 1. In this case, the substrate D1 is released from the fixed mold 11 in a state remaining within the movable mold 21. Then, the ejector pin 27 and the ejector sleeve 25 are moved toward the fixed mold 11, whereby the resin material remaining in the runner Ru1 and the substrate D1 are pushed out. Thus, the substrate D1 is produced. At this time, as shown in FIG. 4, the central portion of the substrate D1 is formed with the central hole D1*h* and the hollow cylindrical protruding portion D1*r*. Further, micro asperities on the groove-forming surface 16*b* of the stamper 16 are imprinted in a predetermined area of one surface (hereinafter referred to as the "surface Da") of the substrate D1, whereby grooves, not shown, are formed therein.

As described above, according to the mold assembly 1, the outer peripheral surface 15*b* of the portion E of the stamper holder 15 which protrudes from the mirror surface 13*b* is formed to have a shape complementary to the inner peripheral surface 16*c* of the stamper 16, whereby the stamper 16 is held by the stamper holder 15 in a state of the entire inner peripheral surface 16*c* of the stamper 16 being in surface contact with the outer peripheral surface 15*b* of the stamper holder 15. Therefore, compared with the conventional mold assembly 110 in which the conventional stamper 119 and the inner periphery-side stamper holder 118 are in line contact with each other, the frictional force between the stamper holder 15 and the stamper 16 is increased, so that the force of the stamper holder 15 holding the stamper 16 can be increased while enabling reduction of the wear of the stamper 16. Therefore, it is possible to positively prevent the displacement (eccentricity) of the stamper 16 during molding, whereby the stamper 16 can be positioned with high accuracy. As a result, it is possible to form the substrate D1 having a high quality. Further, since there is no gap formed between the inner peripheral surface 16*c* of the stamper 16 and the outer peripheral surface 15*b* of the stamper holder 15, it is possible to prevent formation of burrs on the surface of the substrate D1. Further, since the length of protrusion of the stamper holder 15 from the mirror surface 13*b* is defined such that the end face 15*a* of the stamper holder 15 and the rim of the insertion hole 16*a* in the groove-forming surface 16*b* of the stamper 16 are flush with each other, it is possible to prevent undesired steps formed on the surface of the substrate D1.

Figure 5:
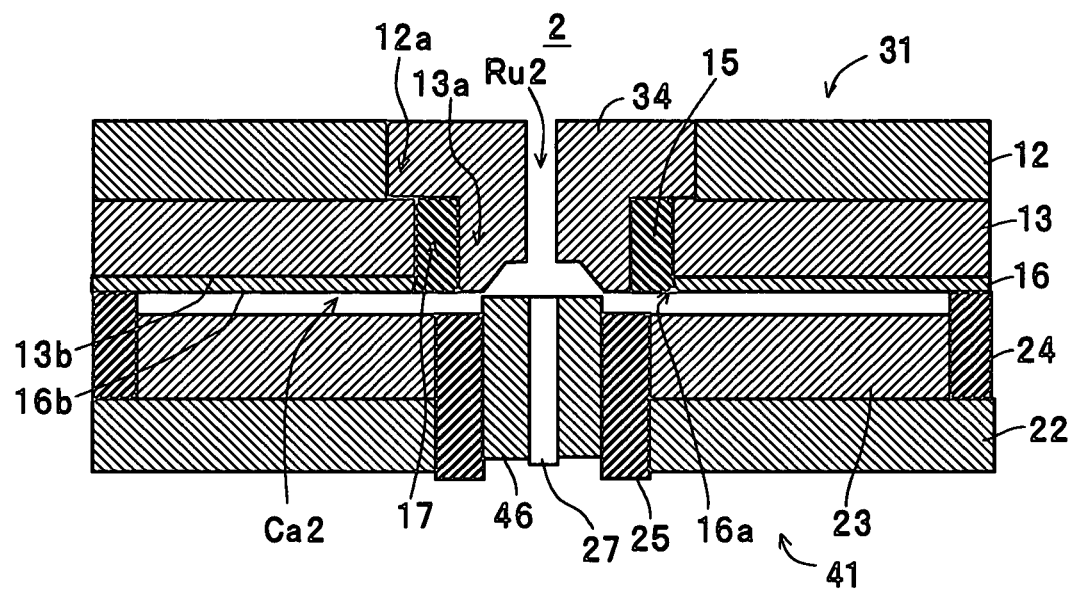
FIG. 5 is a cross-sectional view showing the construction of a mold assembly according to another embodiment of the present invention.
Figure 6:
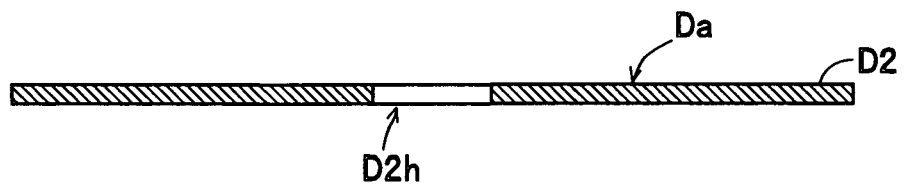
FIG. 6 is a front cross-sectional view of a substrate manufactured by the mold assembly shown in FIG. 5.

It should be noted that the present invention is not limited to the above embodiment. For example, the stamper holder 15 according to the invention can be applied to a mold assembly 2 constructed as shown in FIG. 5. It should be noted that in the following description of the mold assembly 2, the component parts and elements identical to those of the mold assembly 1 are designated by identical reference numerals and duplicate description thereof will be omitted. As shown in FIG. 5, the mold assembly 2 has a sprue bushing 34 disposed therein, in place of the sprue bushing 14 of the fixed mold 11 used in the mold assembly 1. Further, it has a gate cutting sleeve 46 disposed therein, in place of the gate cutting sleeve 26 of the movable mold 21 used in the mold assembly 1. In this mold assembly 2, when a fixed mold 31 and a movable mold 41 are closed, a disk-shaped runner Ru2 is defined between the upper surface of the gate cutting sleeve 46 and the end face of the ejector pin 27, and an inner peripheral surface of the sprue bushing 34, as shown in FIG. 5. Further, a cavity Ca2 formed by the molds 31 and 41 is a disk-shaped flat space. Therefore, when the mold assembly 2 is used, the substrate D2 is formed, as shown in FIG. 6. As shown in this figure, a central hole D2*h*, which forms a mounting central hole of an optical recording medium, is formed in a central portion of the substrate D2.

Figure 7:
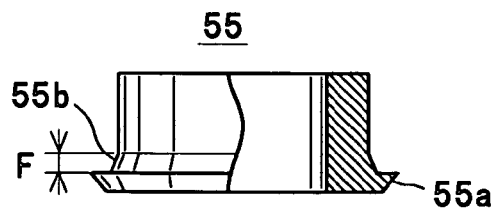
FIG. 7 is a partly cut-away front view showing the construction of another stamper holder.
Figure 8:
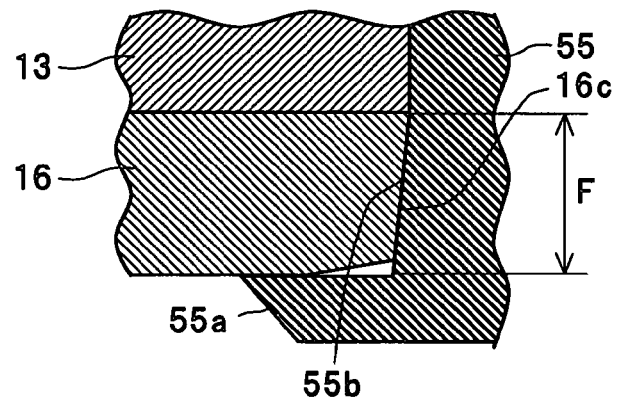
FIG. 8 is an enlarged cross-sectional view of an essential portion, designated by F in FIG. 7, of the stamper holder and portions of components associated therewith in a state where the stamper is mounted using the stamper holder.

Further, it is possible to employ a stamper holder 55, as shown in FIGS. 7 and 8, in the mold assembly 1 (or the mold assembly 2) in place of the stamper holder 15. In this case, the stamper holder 55 is configured such that a portion F corresponding to the portion E of the stamper holder 15 is formed to be longer than the portion E e.g. by 0.02 mm (length equal to or longer than the amount or length of recession in the vicinity of the rim of the insertion hole 16*a* of the stamper 16), such that a foremost end of the portion F and the groove-forming surface 16*b* of the stamper 16 are flush with each other, and an engaging portion 55*a* having an annular shape is formed on the foremost end of the portion F. In this case, the engaging portion 55*a* is configured such that when the stamper 16 is mounted in the fixed mold 11 (or 31) with the stamper holder 55 fitted in the insertion hole 16*a* of the stamper 16, the engaging portion 55*a* can be engaged with the rim of the insertion hole 16*a* in the stamper 16. With this stamper holder 55, similarly to the stamper holder 15, all the region of the outer peripheral surface 55*b* of the portion F formed to have a shape complementary to the inner peripheral surface 16*c* of the stamper 16 is in surface contact with the inner peripheral surface 16*c*, so that frictional force between the stamper holder 55 and the stamper 16 increases whereby the force of the stamper holder 55 holding the stamper 16 can be increased. Similarly, it is possible to reduce the wear of the stamper 16. Therefore, it is possible to positively prevent the displacement (eccentricity) of the stamper 16 during molding, whereby the stamper 16 can be positioned with high accuracy. As a result, it is possible to form the substrate D1 (or D2) having a high quality.

Further, although in the above embodiment, the description has been given of the case in which the substrate D1 (or D2) for an optical recording medium as an example of the information recording medium is formed, this is not limitative, but it goes without saying that the stamper, the mold component, and the mold assembly, according to the present invention, can be also applied to a discrete-track recording medium, as the information recording medium.

What is claimed is:

1. A mold component for being mounted in a mold of a mold assembly that molds a substrate for an information recording medium, comprising:

a flat disk-shaped stamper having a molding surface for forming micro asperities in a surface of the substrate for the information recording medium and having an insertion hole extending through a central portion thereof; an inner peripheral surface of the central portion that defines the insertion hole comprising a sloped surface which has a larger diameter on the molding surface side compared with a diameter on an opposite side; and a stamper holder configured such that an outer periphery of the stamper holder has a gradually increased diameter from an end of a reverse side toward an end of the molding surface to form a sloped surface and to fit in the insertion hole extending through the central portion of the stamper, thereby holding the stamper, wherein an entire outer peripheral surface of the stamper holder, which is complementary to an inner peripheral surface of the stamper defining the insertion hole, has a sloped shape, and wherein the stamper holder is configured such that an end face of the stamper holder on a cavity side is flush with the molding surface.

2. A mold assembly that molds a substrate for an information recording medium, comprising:

a mold; and a mold component configured to be mounted in the mold, the mold component comprising:

a flat disk-shaped stamper having a molding surface for forming micro asperities in a surface of the substrate for the information recording medium and having an insertion hole extending through a central portion thereof; an inner peripheral surface of the central portion that defines the insertion hole comprising a sloped surface which has a larger diameter on the molding surface side compared with a diameter on an opposite side; and a stamper holder configured such that an outer periphery of the stamper holder has a gradually increased diameter from an end of a reverse side toward an end of the molding surface to form a sloped surface and to fit in the insertion hole extending through the central portion of the stamper, thereby holding the stamper, wherein an entire outer peripheral surface of the stamper holder, which is complementary to an inner peripheral surface of the stamper defining the insertion hole, has a sloped shape, and wherein the stamper holder is configured such that an end face of the stamper holder on a cavity side is flush with the molding surface.

* * * * *